United States Patent [19]

Louridas

[11] Patent Number: 5,300,308

[45] Date of Patent: Apr. 5, 1994

[54] PREPARED PACKAGE FOR HOT LIQUID CONTAINING PRODUCTS

[76] Inventor: Panagiotis Louridas, 2101 Islington Ave., Unit #2006, Weston, Ontario, Canada, M9P 3R2

[21] Appl. No.: 107,586

[22] Filed: Aug. 18, 1993

Related U.S. Application Data

[63] Continuation-in-part of Ser. No. 878,961, May 6, 1992, Pat. No. 5,240,722.

[51] Int. Cl.$^5$ .................. B65D 85/00; B65D 81/32; B65D 81/34
[52] U.S. Cl. .................. 426/112; 426/77; 426/115; 426/506; 99/295; 99/302 R; 99/304; 99/306
[58] Field of Search ............ 426/77, 112, 433, 107, 426/234, 243, 241, 106, 115, 506; 99/300, 302 R, 304, 306, 316, 295

[56] References Cited

U.S. PATENT DOCUMENTS

| | | | |
|---|---|---|---|
| 2,176,082 | 10/1939 | Kise | 426/433 |
| 3,589,272 | 6/1971 | Bouladon | 426/112 |
| 3,978,233 | 8/1976 | Bolt | 426/115 |
| 4,104,957 | 8/1978 | Freedman et al. | 99/306 |
| 4,417,504 | 11/1983 | Yamamoto | 426/115 |
| 4,627,334 | 12/1986 | Shanklin | 99/306 |
| 4,900,886 | 2/1990 | Bridges | 426/241 |
| 4,908,222 | 3/1990 | Yu | 426/241 |
| 4,920,871 | 5/1990 | Anson et al. | 99/295 |
| 4,999,466 | 3/1991 | Waligorski | 99/302 |
| 5,010,221 | 4/1991 | Grossman | 426/241 |
| 5,028,753 | 7/1991 | Shariat | 99/306 |
| 5,049,713 | 9/1991 | Creyaufmuller | 99/306 |
| 5,064,980 | 11/1991 | Grossman et al. | 426/241 |
| 5,088,179 | 2/1992 | Gibbon | 426/243 |

Primary Examiner—Steven Weinstein

[57] ABSTRACT

A prepared package for use with a water heating device makes a liquid containing product. The package has an upper water containing chamber and a lower product ingredients containing chamber. The upper and lower chambers are completely separated from one another by a permanent liquid impervious membrane. The package includes a water outlet from the upper chamber and a water inlet to the lower chamber. The water inlet and the water outlet of the package have openable seals and are sized and orientated to fit with a water inlet and water outlet respectively of the water heating device to provide fluid communication between the package and the water heating device such that upon opening the seals, water flows from the upper chamber of the package through the water heating device and into the lower chamber of the package enabling heated water to mix with the product ingredients in making the product. The upper and lower chambers are secured to one another by a releasable connection and the membrane remains with the upper chamber upon releasing the connection thereby exposing the product in the lower chamber.

3 Claims, 5 Drawing Sheets

PREPARED PACKAGE FOR HOT LIQUID CONTAINING PRODUCTS

This application is a continuation-in-part application of U.S. patent application Ser. No. 07/878,961 filed May 6, 1992, now U.S. Pat. No. 5,240,722.

FIELD OF THE INVENTION

The present invention relates to a package containing both liquid and product ingredients ready for mixing and making a hot liquid containing product.

BACKGROUND OF THE INVENTION

People who drive long distances and generally in a hurry like to take a hot beverage such as a cup of coffee with them but often do not have time to make a coffee stop. Furthermore, many coffee drinkers are not prepared to accept the kind of coffee provided at local coffee shops and the like. These people would like to make their own coffee but again, do not have sufficient time.

Some people prefer beverages other than coffee such as soup and the like. Again, it can be awkward finding a place that will provide soup and other types of beverages when one is in a hurry.

Although not widely known, the prior art does disclose single serving beverage packages as shown for example in U.S. Pat. No. 3,589,272. These types of packages are hooked up to a portable boiler to prepare a hot beverage directly in one's car or other relatively inaccessible area.

According to U.S. Pat. No. 3,589,272 water is carried in an upper chamber of the package and separated by a membrane from coffee grinds held in a filter in a lower chamber of the package. The entire package is inserted in a heater which both heats the water in the upper chamber and causes the membrane to give way allowing the water to then drain downwardly into the filter of the lower chamber producing a hot cup of coffee.

There are potential problems associated with the structure in U.S. Pat. No. 3,589,272. In particular the membrane may be subject to premature breakdown before the water has reached a suitably heated temperature in which case the coffee is well below the desired temperature as it drains from the package. Furthermore, when the member separating the upper and lower chambers detaches from its sealing position it could clog and block drainage of the coffee from the package. In addition, the structure in U.S. Pat. No. 3,589,272 is awkward to handle. It requires two hands because the entire package is placed in a heater where the hands are subject to possible burning. Furthermore, the entire package must be made from materials which are not going to break down as a result of being inserted in the heater.

SUMMARY OF THE INVENTION

The present invention provides a prepared package for use with a water heating device for making a hot liquid containing product. The package comprises an upper water containing chamber and a lower product ingredients containing chamber. The upper and lower chambers are completely separated within the package by a permanent liquid impervious membrane. A water outlet is provided from the upper chamber and a water inlet is provided to the lower chamber. The water inlet and water outlet of the package have openable seals and are sized and orientated to fit with a water inlet and water outlet respectively of the water heating device to provide fluid communication between the package and the water heating device such that upon opening the seals, water flows from the upper chamber out of the package through the water heating device and then into the lower chamber of the package enabling heated water to mix with the product ingredients in making the product. The upper and lower chambers are secured to one another by a releasable connection with the membrane remaining with the upper chamber upon releasing the connection thereby exposing the product in the lower chamber.

BRIEF DESCRIPTION OF THE DRAWINGS

The above as well as other advantages and features of the present invention will be described in greater detail according to the preferred embodiments of the present invention in which.

DETAILED DESCRIPTION OF THE PREFERRED EMBODIMENTS

Figure 1:
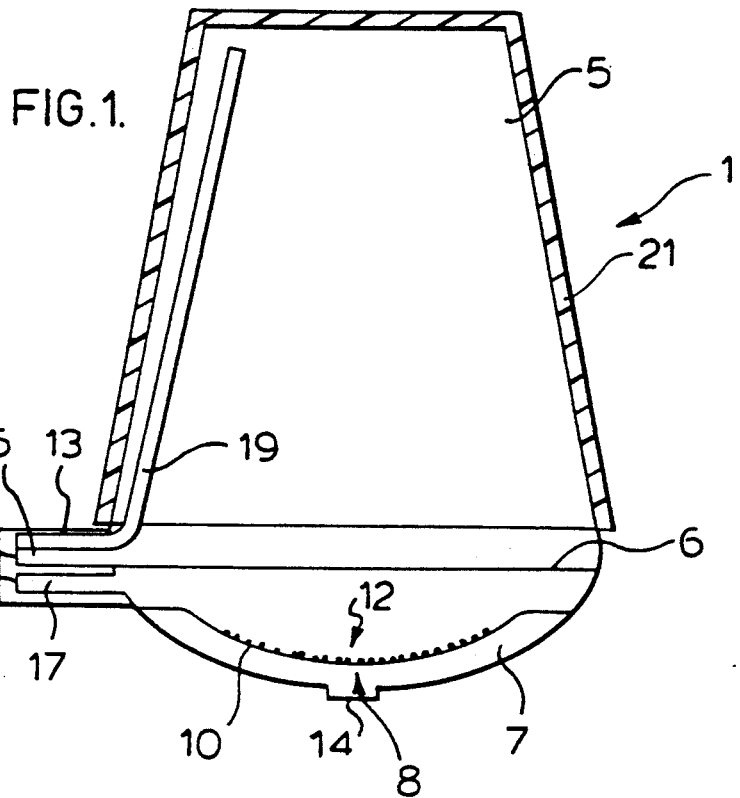
FIG. 1 is a sectional view through a prepared beverage package including its own stored cup in accordance with the present invention.
Figure 2:
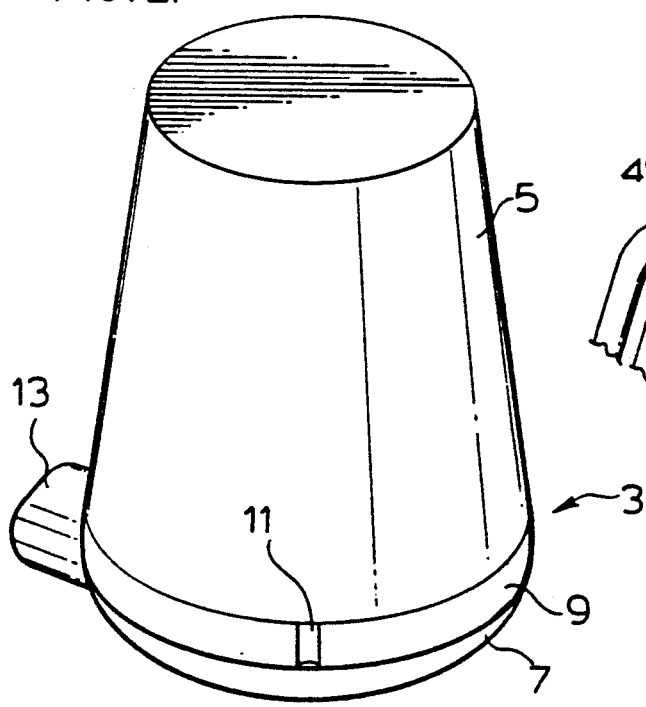
FIG. 2 is a perspective view of the package of FIG. 1 with the cup removed.

FIG. 1 shows a prepared package for a single hot beverage serving generally indicated at 1. This overall package comprises a cup 21 telescopically stored over the remainder of the package generally indicated at 3 as seen in FIG. 2 of the drawings. The cup is quickly and easily removed from the package where both the package and the cup are fitted to a heating device generally indicated at 23 in FIG. 4 of the drawings.

The package 3 comprises an upper liquid containing chamber 5 and a lower beverage ingredient containing chamber 7. The upper chamber has a frustoconical configuration as shown which matches the shape of cup 21 so that the cup nestles down over the remainder of the package which minimizes storage and shipping space requirements for the package, i.e, the cup when stored as shown, adds very little to the overall size of the package.

As best seen in FIG. 1 of the drawings, the key to the overall invention is the provision of a water impervious permanent membrane 6 which divides the upper chamber from the lower chamber. The upper chamber contains a liquid which in this case is water, while the lower chamber is provided with a filter 10 containing beverage making ingredients generally indicated at 12. The concept of the invention is to mix the liquid in the upper chamber with the ingredients in the lower chamber. However, the liquid in the upper chamber does not go directly through but rather by passes membrane 6 in order to get to the lower chamber as described later in detail.

Provided on the side of package 3 is a nipple 13. This nipple includes an outlet 15 from the upper chamber and an inlet 17 to the lower chamber. As will be seen in FIG. 1, outlet 15 feeds from above membrane 6 while inlet 17 feeds to a position below the membrane.

Outlet 15 from the upper chamber is sealed as indicated at 16. The inlet 17 to the lower chamber is also preferably sealed as indicated at 18. Provided on the bottom of the lower chamber is a drain 8 which is covered by a seal 14. This seal in combination with the seal 18 over the inlet to the lower chamber maintain the freshness of the beverage ingredients supported by filter 10.

Provided directly around the body of package 3 is a reinforcing strip 9. This reinforcing strip includes a pair of indents or recesses 11 located diametrically opposite one another on the package. These indents are used in supporting the package within the heating device 23.

Figure 4:
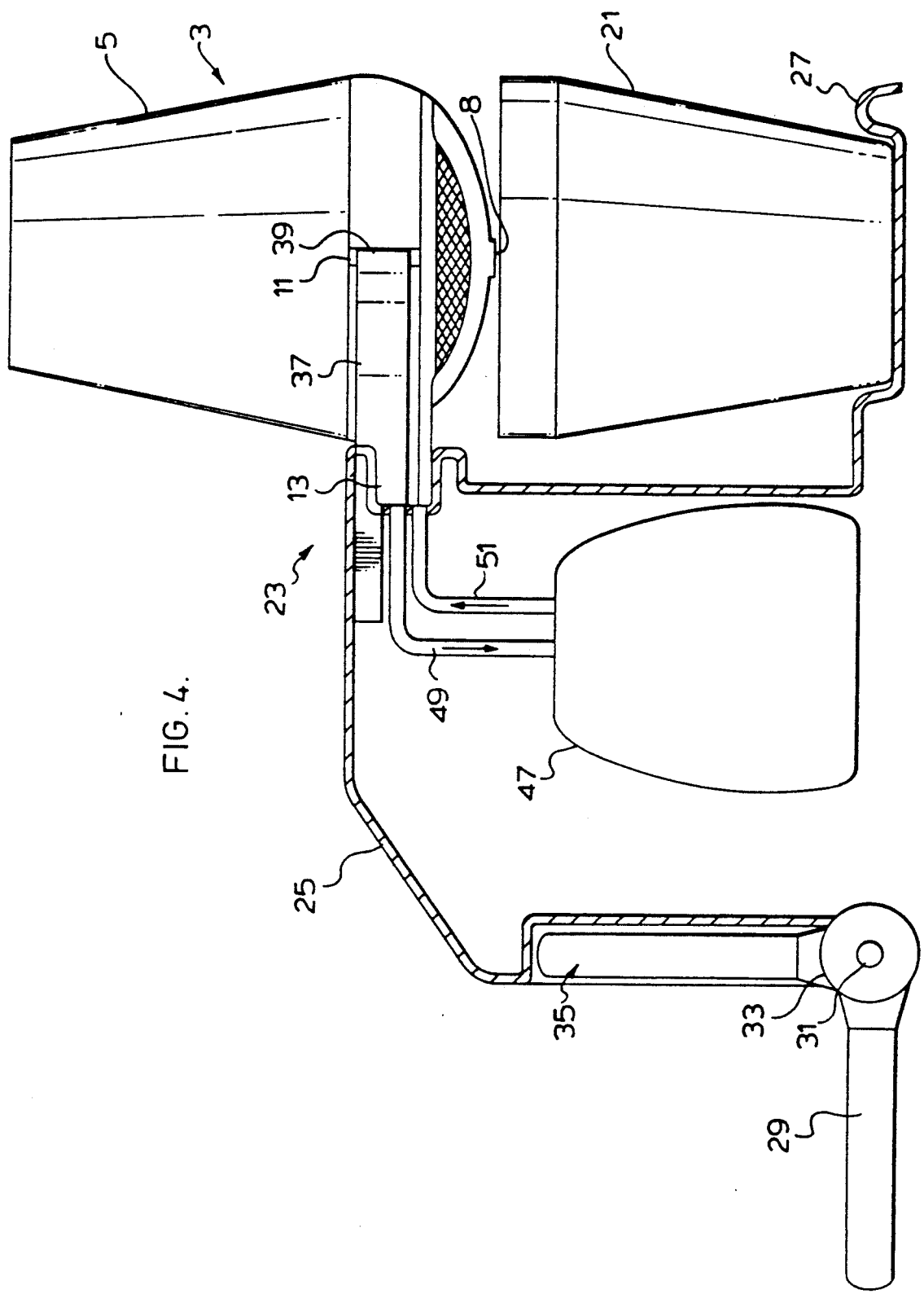
FIG. 4 is a side view of the package of FIG. 2 inserted in heating device according to a preferred embodiment of the present invention.
Figure 5:
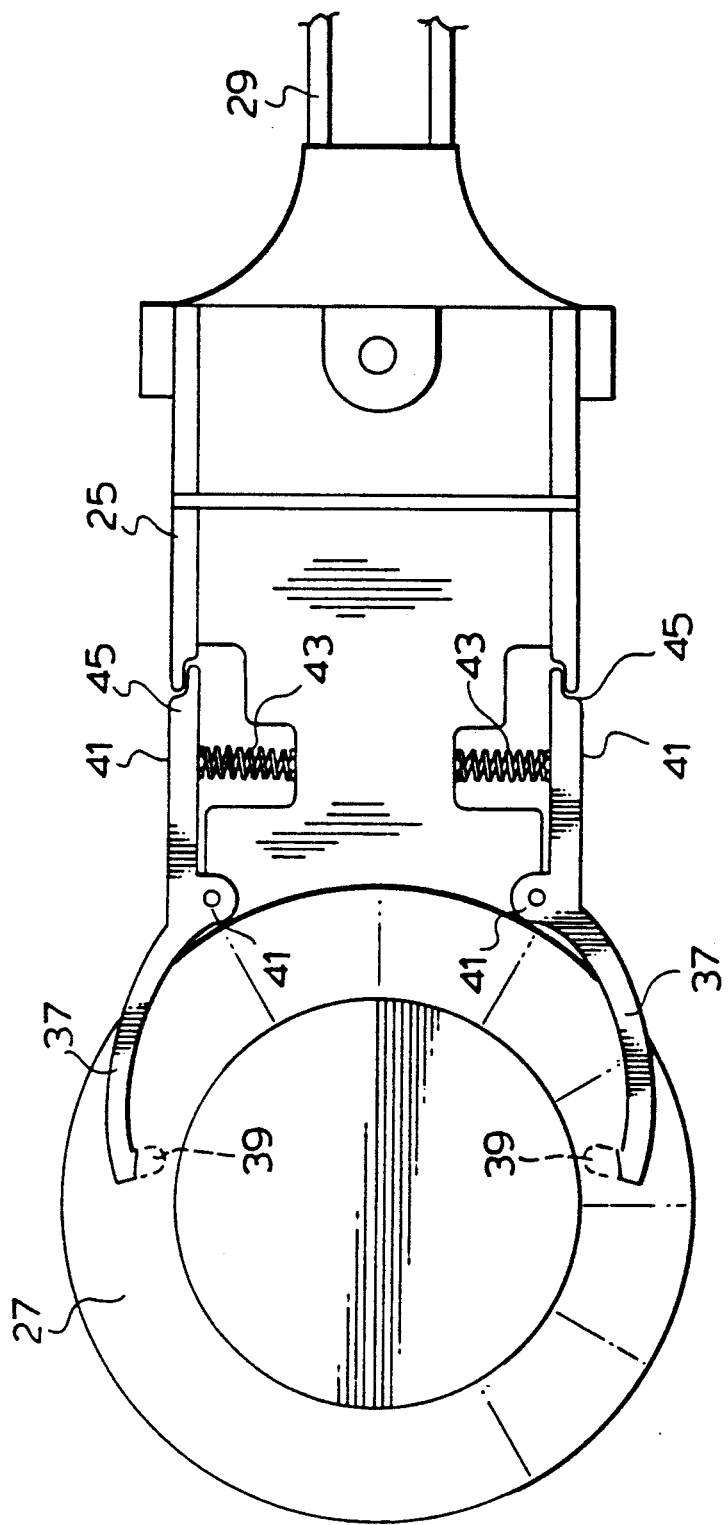
FIG. 5 is a top view of the heating device of FIG. 4 with the beverage package removed from the device.

The heating device itself includes a main frame having a forward cup seat 27 which receives cup 21 as shown. Provided above cup seat 27 are a pair of spring loaded arms 37 with hook ends 39 as best seen in FIG. 5 of the drawings. The hooks 39 on the ends of arms 37 engage within the recesses 11 of package 3 to support the package on the device as shown in FIG. 4 of the drawings.

More particularly, arms 37 are pivotally mounted at 41 to the frame. Springs 43 trapped in a recess in the frame push outwardly near the ends 45 of arms 37 so that the arms are normally biased to a clamping position relative to package 3. However, by pushing inwardly on the arm ends 45 against the pressure of springs 43 the hook ends of the arms open outwardly allowing release of the package or insertion of a new package within the clamp arms. Note the frame and the arm ends 45 overlap in a manner to prevent the arm ends from springing too far outwardly and the frame further controls the depth to which the arm ends can be pushed inwardly.

Figure 3:
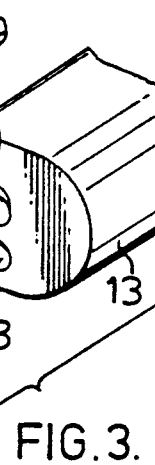
FIG. 3 is a perspective view of the side nipple of the package of FIG. 2 ready for fitting with inlet and outlet tubes of a heating device.

Also provided in device 23 is a small boiler 47 having an inlet tube 49 and an outlet tube 51 from the boiler. Tube 49 and tube 51 are fitted in the outlet 15 and the inlet 17 of package 3 respectively as shown in FIG. 3 of the drawings. The tubes as they are pushed into the package rupture the seals 16 and 18. At this point the seal 14 covering the bottom spout 8 of the package is also removed. Seal 14 is preferably in the form of some type of an adhesive peel off strip.

Heating device 23 further includes an electrical connector 29 wired to boiler 47. In the preferred embodiment, this connector is shaped and sized to fit directly within an automobile cigarette lighter. It is pivotally mounted at 31 to the frame 23 with a tension control adjustment 33 for tightening the position or setting of electrical connector 29. When the electrical connector is set in the FIG. 4 position, it extends outwardly so that it can be plugged directly into a cigarette lighter with the rest of the frame sitting in a horizontal operating position as shown. For storage purposes, the tension adjuster 33 is released allowing connector 29 to be rotated upwardly into a recessed region 35 on the back of the frame.

Electrical connector 29 can also be fitted with additional electrical leads which are not shown and which would be used for connecting with a standard AC outlet or which would include an additional electrical connector fittable directly into an automobile cigarette lighter to allow use of the heating device remotely of the cigarette lighter.

In order to prepare a hot beverage serving, one simply removes cup 21 from the package 3 and places the cup on the cup support of the heating device. Seal 14 is then removed from spout 8 on the package. The package is clamped in the arms 37 and the tubes 49 and 51 are pushed into the outlet 15 from the upper chamber and into the inlet 17 to the lower chamber of package 3. The device is then connected to a source of power which operates the boiler 47.

The actual boiler is a commercially available product which constantly maintains a small charge of water which, like many larger coffee maker boilers, etc., operates on a displacement principle. As soon as the seal to the upper chamber in the package has been ruptured, the water will flow through outlet 15 from the upper chamber along inlet tube 49 to boiler 47. This displaces the liquid or water already in the boiler which causes the boiler to operate sending a charge of steam up through the outlet tube 51 from the boiler into lower chamber 7 of the package through its inlet 17. The boiled water enters as steam and condenses on the filter 10 within the lower chamber of the package to mix with the beverage ingredients 12 where the mixture then drains out through the bottom spout or drain 8 into cup 21.

In order to assist in venting of the liquid from the upper chamber 5 of the package, inlet 15 includes a venting tube 19 which extends to the top of the upper chamber as shown in FIG. 1 of the drawings. Before using the package, the venting tube is also covered by seal 16. However, after the seal is ruptured, the venting tube is opened to atmosphere outwardly around the boiler tube 49 to provide a pressurized dispensing of the liquid from the upper chamber.

In terms of the beverage ingredients in the lower chamber, this can be anything from coffee grinds with a combination of whitener and/or sweetener or it could be something such a soup mix or the like. Therefore, many different types of beverage servings can be prepared according to what has been stocked in package 3.

In order to ensure complete drainage of the mix the lower chamber has a downwardly concave bottom with the spout 8 being located centrally of the lower chamber. Therefore, the spout is located at the lowest point in chamber 7 providing complete drainage of the chamber.

As will be noted, the membrane 6 between the upper and lower chambers remains intact at all times. Therefore, there is a constant separation between the upper and lower chambers. The only way that the liquid or water can pass from the upper to the lower chamber is through the heating device and assuming the heating device is operative, this ensures a properly heated beverage at all times.

Figure 6:
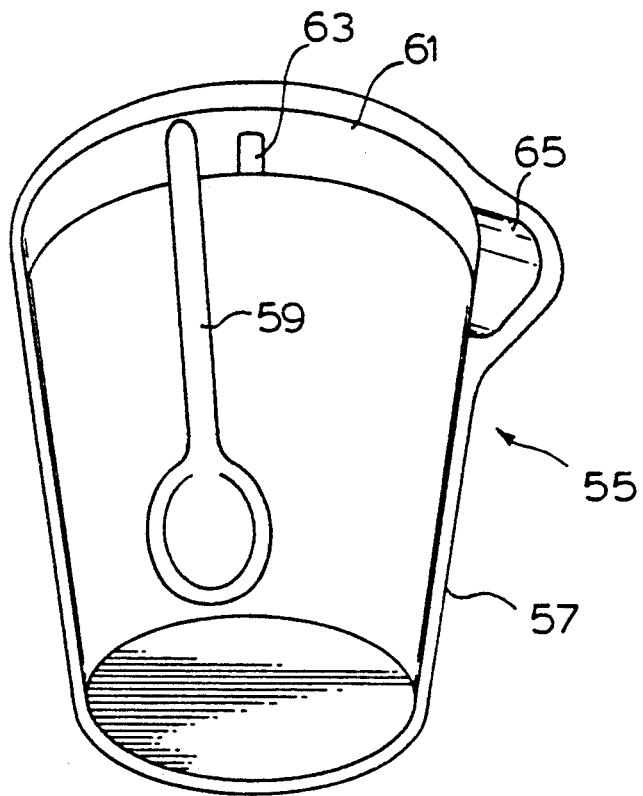
FIG. 6 is a perspective view of an alternate form of a prepared package according to a further preferred embodiment of the present invention.
Figure 7:
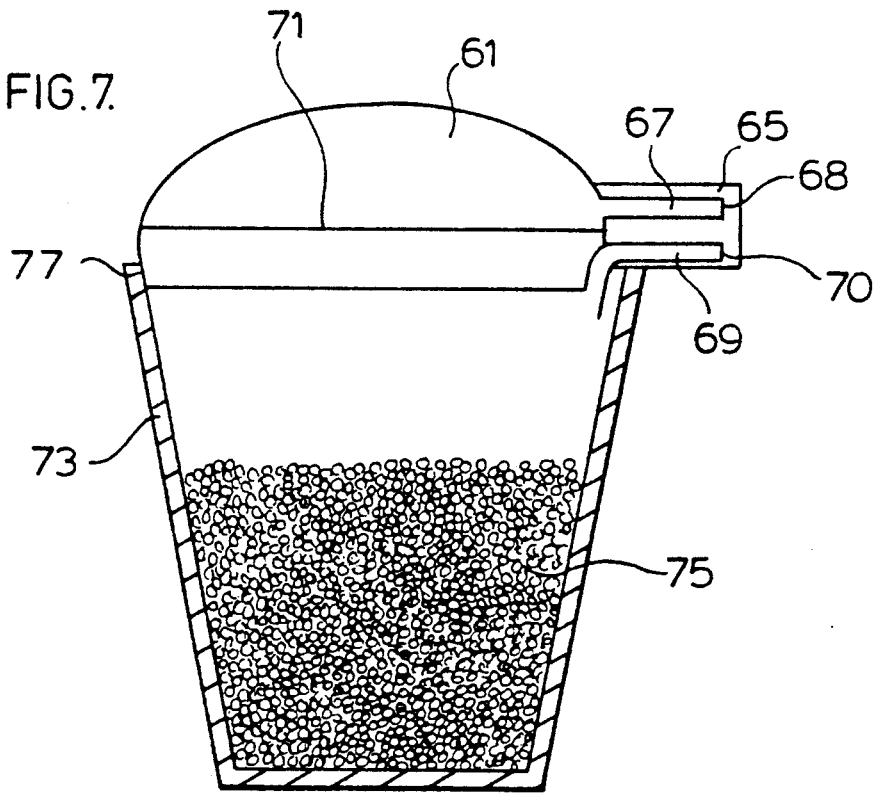
FIG. 7 is a sectional view through the package of FIG. 6.

FIGS. 6 and 7 show an alternative embodiment of the present invention in which package 55 is specifically prepared to provide a hot soup mix. This package includes an upper water containing chamber 61 and a lower chamber 73 containing soup ingredients generally indicated at 75.

It is to be understood that package 55 could also be used for other types of hot liquid products including instant coffee and the like which do not require the use of a filter as described with respect to the package shown in FIGS. 1 and 2 of the drawings.

Referring now primarily to FIG. 7, water containing chamber 61 is separated from ingredient containing chamber 73 by means of a liquid impervious membrane 71. A nipple, generally indicated at 65, extends to one side of the package and contains an outlet 67 from upper chamber 61 and an inlet 69 into chamber 73. Outlet 7 is sealed by an openable seal 68 and inlet 69 is sealed by an openable seal 70. Seal 68 ensures that the water remains trapped in chamber 61 until seal 68 is opened and membrane 71 ensures that the water in the upper chamber cannot pass directly to the lower chamber without first going through the nipple as to be described later in detail. The outlet 67 preferably includes a venting passage similar to vent 19 described in the earlier embodiment. The vent is also covered by seal 68.

Upper chamber 61 is connected to lower chamber 73 by means of a releasable connection 77. In the embodiment as shown, the upper and lower chambers are threadably connected to one another.

In order to maintain freshness of the ingredients in the lower chamber, an air tight seal is provided on the package. This air tight seal could either be in the form of some type of a hermetic seal between the upper and lower chambers or in the embodiment as shown in FIG. 6, it comprises a wrapping 57 sealed around the entire package. A spoon 59 or other type of serving utensil is trapped within the wrapping where it is covered from dirt and contamination until the wrapping is opened. Also, the enclosing of the utensil 59 in the wrapping ensures that the utensil remains with the package until the wrapping is removed.

Figure 8:
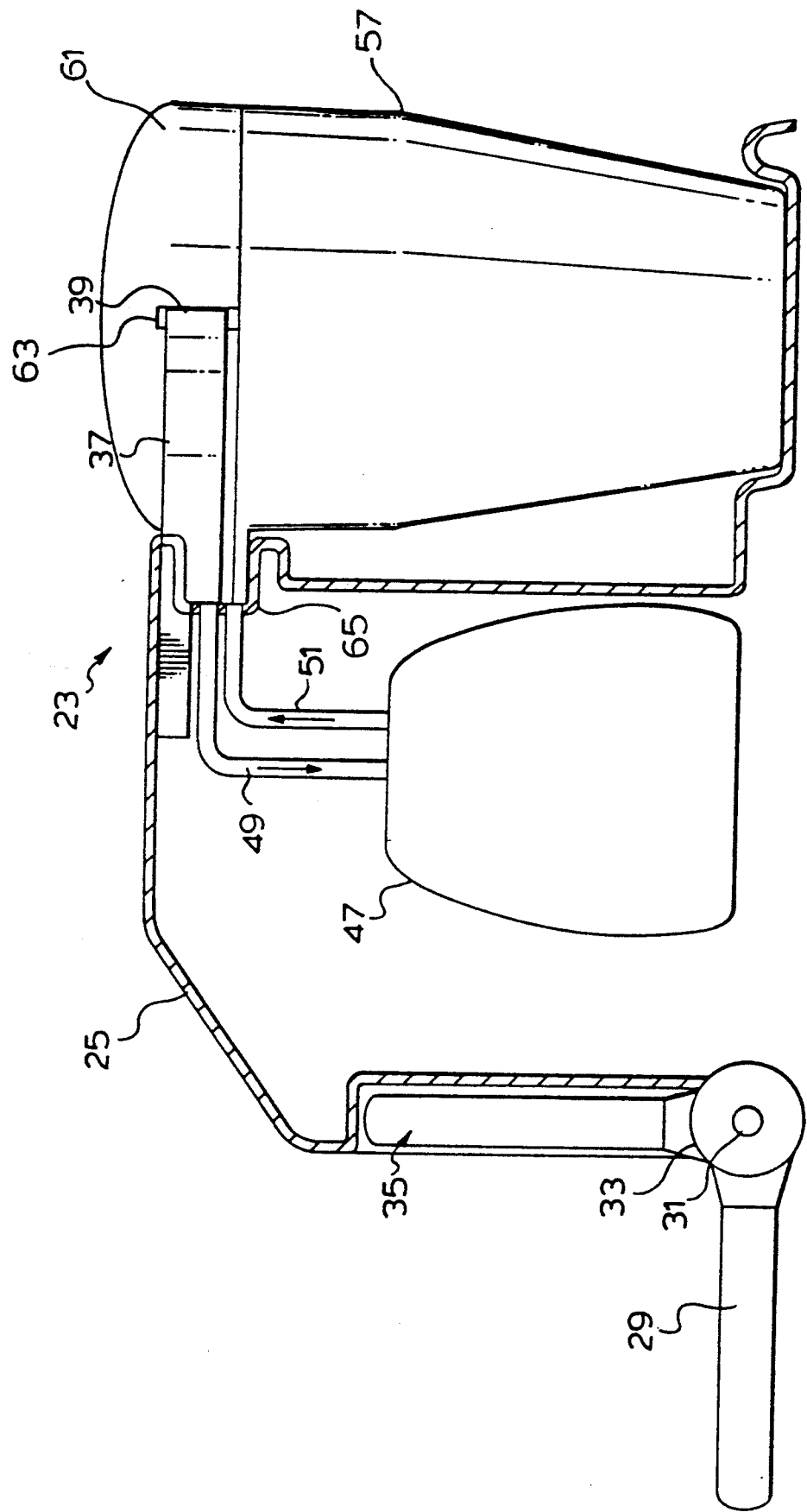
FIG. 8 is a side view of the package of FIG. 6 inserted in the same liquid heating device as that shown in FIG. 4 of the drawings.

After removing wrapping 55 the, method of inserting package 55 into the water heating device is substantially identical to that earlier described. The only difference is that the package does not include any type of a drip spout and it sits lower in the water heating device as shown in FIG. 8 of the drawings.

Consistent with the earlier described embodiment, nipple 65 in which water outlet 67 from the upper chamber and inlet 69 to the lower chamber are carried connects directly to boiler inlet 49 and boiler outlet 51 respectively. The connection of the inlet to the boiler with the outlet from the water containing chamber automatically pierces or opens seal 68 while the connection of boiler outlet 51 to lower chamber inlet 69 automatically pierces or opens seal 70. The barbs 39 on the ends of clamp arms 37 of the water heating device fit into recesses 63 (only one of which can be seen in FIG. 8) in the sides of the upper chamber 61.

After the package has been fitted into the water heating device, the water in upper chamber 61 flows through its outlet 67 down along boiler inlet 49 where it boiled in the boiler and then returns through boiler outlet 51 to the now open inlet 69 into lower chamber 73. The boiled or heated water mixes with ingredients 75 to make in this case a heated soup mix. The soup mix should be allowed to stand for several minutes for a thorough heating of the ingredients by the boiled water.

After heating and mixing of the water with the soup ingredients, the upper chamber 61 is released at threaded connection 77 from the lower chamber 73. As will be seen from FIG. 7 of the drawings, membrane 71 is carried with the upper chamber so that once the upper chamber is removed it completely exposes the soup product which is now available to consume in the cup-like lower chamber. Spoon 59 can be used for eating the soup product or one can simply drink the soup product from the lower cup-like chamber or container.

As will be appreciated from the above, the overall set up is very portable in nature and can be used in substantially any desired location including an automobile, a private office or anywhere else that one wishes to use the package and device. The boiler, as earlier described, can be operated from a power source such as a cigarette lighter in the automobile or can even be powered by a standard AC outlet. If desired, it can also use a portable DC power source. The frame of the heating device is sized and suitably designed to mount at different locations within an automobile or any other area where the device is used.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A prepared sealed package for use with a water heating device having a water inlet and a water outlet for making a hot liquid containing consumable product, said sealed package comprising an upper water containing chamber and a lower edible ingredients containing chamber said edible ingredients requiring reconstitution with water to make the consumable product, said water in said upper chamber and said edible ingredients in said lower chamber being completely separated within the package by a permanent liquid impervious membrane, said sealed package further comprising a water outlet from and attached to said upper chamber and a water inlet attached to said lower chamber, said water inlet and said water outlet of said package having openable seals, said water outlet from said upper chamber and said water inlet to said lower chamber being sized and oriented to fit with said water inlet and said water outlet respectively of the water heating device to provide fluid communication between said package and the water heating device such that upon opening said seals, water flows from the upper chamber out of the package through the water heating device and heated water then flows into the lower chamber of said package enabling the heated water to mix with said edible ingredients to make the consumable product, said upper and lower chambers being secured to one another by a releasable connection and said membrane remaining with said upper chamber upon releasing said connection thereby exposing said consumable product in said lower chamber.

2. A prepared package as claimed in claim 1, wherein said package is sealed by being encased within a sealed wrapping and additionally including a utensil trapped within said wrapping in said package.

3. A prepared package as claimed in claim 1, wherein said upper and lower chambers are releasably connected by a threaded connection to one another.

* * * * *